(12) United States Patent
Thiesen et al.

(10) Patent No.: US 7,405,675 B2
(45) Date of Patent: Jul. 29, 2008

(54) SYSTEM AND METHOD FOR REDUCING SEARCH TIME AND INCREASING SEARCH ACCURACY DURING INTERROGATION OF RESONANT DEVICES

(75) Inventors: Jack Thiesen, Easley, SC (US); George P. O'Brien, Piedmont, SC (US)

(73) Assignee: Michelin Recherche et Technique S. A., Granges-Paccot (CH)

( * ) Notice: Subject to any disclaimer, the term of this patent is extended or adjusted under 35 U.S.C. 154(b) by 239 days.

(21) Appl. No.: 11/335,183

(22) Filed: Jan. 19, 2006

(65) Prior Publication Data
US 2007/0176764 A1 Aug. 2, 2007

(51) Int. Cl.
*G08B 21/00* (2006.01)
*B60C 23/00* (2006.01)

(52) U.S. Cl. .............. 340/870.16; 324/76.51; 340/447

(58) Field of Classification Search .......... 340/572.1, 340/572.4, 539.16, 539.17, 539.26, 870.16, 340/870.17, 447; 73/579; 324/76.51; 235/449
See application file for complete search history.

(56) References Cited

U.S. PATENT DOCUMENTS

| 5,604,486 | A | | 2/1997 | Lauro et al. | |
|---|---|---|---|---|---|
| 5,942,991 | A | * | 8/1999 | Gaudreau et al. | 340/870.16 |
| 6,278,379 | B1 | * | 8/2001 | Allen et al. | 340/870.16 |
| 6,765,493 | B2 | | 7/2004 | Lonsdale et al. | |
| 7,065,459 | B2 | * | 6/2006 | Kalinin et al. | 340/572.1 |
| 7,245,117 | B1 | * | 7/2007 | Joy et al. | 324/76.53 |
| 2002/0117005 | A1 | | 8/2002 | Vile et al. | |
| 2004/0020299 | A1 | | 2/2004 | Freakes et al. | |
| 2004/0239504 | A1 | | 12/2004 | Kalinin et al. | |
| 2005/0007239 | A1 | * | 1/2005 | Woodard et al. | 340/10.2 |

FOREIGN PATENT DOCUMENTS

GB 2381074 4/2003

\* cited by examiner

*Primary Examiner*—Thomas J Mullen, Jr.
(74) *Attorney, Agent, or Firm*—Dority & Manning, P.A.

(57) ABSTRACT

Methods for determining the resonant frequency for interrogation of a resonant device include steps for generating and transmitting RF interrogation pulses of various bandwidths to energize one or more SAW resonator elements. Initial RF interrogation pulses have a relatively wide bandwidth, such that the general location of a resonant device's resonant frequency can be expediently determined. Then, interrogation pulses having smaller bandwidth pulses can be transmitted near the determined general location of resonance to further narrow the location of resonance. In some emodiments, one or more initial interrogation pulses are transmitted in the center of or at an expected value within a range of operation of a resonant device. If the resonant frequency is not located at this initial location, then the range of operation is divided into halves (or other number of generally equal frequency range segments) and one or more interrogation pulses are transmitted at the center of each of the new search frequency range segments. This process of partitioning the search frequency range continues until the resonant frequency is located.

20 Claims, 4 Drawing Sheets

SYSTEM AND METHOD FOR REDUCING SEARCH TIME AND INCREASING SEARCH ACCURACY DURING INTERROGATION OF RESONANT DEVICES

FIELD OF THE INVENTION

The present invention generally concerns a system and method of interrogating resonator elements such as those present in surface acoustic wave (SAW) devices. Such SAW devices may be incorporated in a tire or wheel assembly for sensing such physical parameters as ambient temperature and pressure. The subject interrogation technologies are generally characterized by reduced search time and increased search accuracy than other known methods.

BACKGROUND OF THE INVENTION

The incorporation of electronic devices with tire structures yields many practical advantages. Tire electronics may include sensors and other components for relaying tire identification parameters and also for obtaining information regarding various physical parameters of a tire, such as temperature, pressure, number of tire revolutions, vehicle speed, etc. Such performance information may become useful in tire monitoring and warning systems, and may even potentially be employed with feedback systems to regulate proper tire pressure levels.

One particular type of sensor, or condition-responsive device, that has been utilized to determine various parameters related to a tire or wheel assembly is an acoustic wave device, such as a surface acoustic wave (SAW) device. Such SAW devices typically include at least one resonator element consisting of interdigital electrodes deposited on a piezoelectric substrate. When an electrical input signal is applied to a SAW device, selected electrodes cause the SAW to act as a transducer, thus converting the input signal to a mechanical wave on the substrate. Other electrodes then reverse the transducer process and generate an electrical output signal. A change in the output signal from a SAW device, such as a change in frequency, phase and/or amplitude of the output signal, corresponds to changing characteristics in the propagation path of the SAW device.

In some SAW device embodiments, monitored resonant frequency and any changes thereto provide sufficient information to determine parameters such as temperature, pressure, and strain to which a SAW device is subjected. SAW devices capable of such operation may include three separate resonator elements. Specific examples of such a SAW device correspond to those developed by Transense Technologies, PLC, specific aspects of which are disclosed in published U.S. Patent Application Nos. 2002/0117005(Vile et al.) and 2004/0020299(Freakes et al.), both of which are incorporated herein by reference for all purposes.

SAW devices in the tire industry have typically been implemented as passive devices, and are interrogated by remote transceiver devices that include circuitry for both transmitting a signal to a SAW device as well as for receiving a signal therefrom. The remote transceiver device, or interrogator, transmits energizing signals of varied frequencies from a remote location to the SAW device. The SAW device stores some of this transmitted energy during excitation and may then transmit a corresponding output signal. A comparison of the interrogator's transmitted and received signals indicates when the SAW device is excited at its resonant frequency. Examples of SAW interrogation technology can be found in U.S. Pat. No. 6,765,493 (Lonsdale et al.) and in UK Patent Application GB 2,381,074 (Kalinin et al.), both of which are incorporated herein by reference for all purposes.

Because the resonant frequency of each resonator element in a SAW varies with given input parameters, SAW interrogators must typically transmit multiple RF interrogation signals in accordance with some predetermined algorithm before the precise resonant frequency(ies) of the SAW resonator element(s) is/are determined. While various interrogation systems and corresponding search algorithms have been developed, no one design has emerged that offers technology for effecting SAW interrogation with reduced search time and accuracy levels as hereafter presented in accordance with the subject technology.

SUMMARY OF THE INVENTION

In view of the recognized features encountered in the prior art and addressed by the present subject matter, improved features and steps for interrogating a resonant device have been developed. Exemplary methods are disclosed for transmitting interrogation pulses at different frequencies, obtaining radiated response levels from a resonant device, and analyzing the received response information to identify the frequency of resonance of such a device.

In accordance with more particular aspects of the disclosed technology, RF interrogation pulses of various bandwidths can be generated and transmitted to energize one or more SAW resonator elements. By beginning a search algorithm with exemplary steps of transmitting and detecting resonator response to interrogation pulses having a relatively wide bandwidth, the general location of a resonant device's resonant frequency can be determined. Then, interrogation pulses having smaller bandwidth pulses can be transmitted near the determined general location of resonance to further narrow the possible location of resonance. Such a search manner provides much more efficiency than known interrogation methods that transmit relatively narrow bandwidth pulses at all possible locations within a given frequency range.

In accordance with other more particular aspects of the present subject matter, it should be appreciated that a substantial amount of versatility is afforded to the precise order and location of where in a search frequency range interrogation pulses are to be transmitted. In some exemplary embodiments, a method of bisection is used whereby one or more initial interrogation pulses are transmitted in the center of or at an expected value within a range of operation of a resonant device. If the resonant frequency is not located at this initial location, then the range of operation is divided into halves (or other number of generally equal frequency range segments) and one or more interrogation pulses are transmitted at the center of or at a randomly selected location within each of the new search frequency range segments. This process of partitioning the search frequency range continues until the resonant frequency is located.

Various features and aspects of the subject system and method for interrogating a resonant device offer a plurality of advantages. The disclosed technology provides for a wireless search and interrogation method that reduces search time, searches more efficiently and improves interrogation results compared with known methods. One way search time is reduced is by selectively choosing where to transmit interrogation pulses as opposed to transmitting pulses at stepped intervals within an entire range of operation of a device. One way interrogation results are improved involves the provision of features and/or steps for increasing the certainty of amplitude measurements obtained from a resonant device. If the phase of all received measurements is normalized, amplitude certainty of measured response values can be more precisely ensured.

In one exemplary embodiment of the present subject matter, a method of determining the resonant frequency of a resonant device includes the steps of partitioning a first designated frequency range into at least two respective first search frequency ranges, energizing the resonant device by transmitting one or more respective first RF pulses characterized by a first bandwidth in selected of the at least two respective first search frequency ranges, and monitoring the response of the resonant device to the one or more first RF pulses to determine if the amount of energy radiated by the resonant device exceeds a first predetermined threshold. If the amount of energy radiated by the resonant device in response to the one or more first RF pulses transmitted in selected one of the at least two respective first search frequency ranges does not exceed the first predetermined threshold, then the partitioning, energizing and monitoring steps are repeated for additional respective search frequency ranges within the at least two respective first search frequency ranges until the amount of energy radiated by the resonant device in response to the one or more first RF pulses exceeds the predetermined threshold level.

In some more particular embodiments of the present subject matter, the first designated frequency range corresponds to the range of operation of the resonant device. The at least two first search frequency ranges may correspond to a first range between the lowest possible frequency in the frequency range of operation of the device and either the center frequency of this range or an expected value within the range and a second range between the selected center frequency or the expected frequency and the uppermost frequency in the frequency range of operation. Initial steps of energizing the resonant device and monitoring the response may be implemented at the center frequency or the expected frequency before the step of partitioning the designated frequency range. In some embodiments, each energizing step may correspond to transmitting a consecutive series of the first RF pulses. Furthermore, each monitoring step may correspond to obtaining at least two maximum or minimum amplitude measurements and then normalizing the phase of such obtained measurements to a predetermined reference phase. In some embodiments, the obtained amplitude measurements are fitted to a decaying exponential curve having a known time constant. In more particular exemplary embodiments, the above steps can also be repeated with the transmission of pulses having a second smaller bandwidth in order to more precisely identify the resonant frequency of the device.

In another exemplary embodiment of the present technology, a method of determining an optimal interrogation frequency for a resonant device includes the steps of transmitting one or more RF pulses characterized by a given bandwidth at a plurality of different frequencies within a given range of frequencies, obtaining an amplitude response measurement for the resonant device at each of the plurality of different frequencies, and then repeating the respective transmitting and obtaining steps for one or more subsequent iterations, wherein the RF pulses in each subsequent iteration are characterized by a bandwidth less than or equal to the bandwidth of the pulses in the preceding iteration. Furthermore, the plurality of different frequencies at which the one or more RF pulses are transmitted in each subsequent iteration are within a selected subset of the given range of frequencies from the preceding iteration.

In more particular exemplary embodiments of the above method, the given range of frequencies from the first iteration of transmitting one or more RF pulses corresponds to a range of operation for the resonant device. Additional exemplary embodiments may include a step of determining whether any of the amplitude response measurements exceed a predetermined value, or alternatively determining at which particular frequency of the plurality of different frequencies in each iteration the largest amplitude response was obtained. This particular identified frequency with the largest amplitude response may then be used in part to identify the new frequency range for subsequent iterations of the listed search steps.

A still further exemplary embodiment of the disclosed technology corresponds to a method of interrogating a resonant device, including steps of establishing one or more search frequency ranges, energizing the resonant device by transmitting one or more RF pulses at a selected frequency within selected of the one or more search frequency ranges, and determining whether the response of the resonant device to the one or more RF pulses at each respective selected frequency exceeds a predetermined value. If the response of the resonant device does not exceed the predetermined value, then the one or more search frequency ranges are partitioned into at least two new search frequency ranges and the aforementioned steps of energizing, determining and partitioning are repeated until the response of the resonant device exceeds the first predetermined value.

Additional objects and advantages of the present subject matter are set forth in, or will be apparent to, those of ordinary skill in the art from the detailed description herein. Also, it should be further appreciated that modifications and variations to the specifically illustrated, referred and discussed features and steps hereof may be practiced in various embodiments and uses of the invention without departing from the spirit and scope of the subject matter. Variations may include, but are not limited to, substitution of equivalent means, features, or steps for those illustrated, referenced, or discussed, and the functional, operational, or positional reversal of various parts, features, steps, or the like.

Still further, it is to be understood that different embodiments, as well as different presently preferred embodiments, of the present subject matter may include various combinations or configurations of presently disclosed features, steps, or elements, or their equivalents (including combinations of features, parts, or steps or configurations thereof not expressly shown in the figures or stated in the detailed description of such figures).

Additional embodiments of the present subject matter, not necessarily expressed in this summarized section, may include and incorporate various combinations of aspects of features, components, or steps referenced in the summarized objectives above, and/or other features, components, or steps as otherwise discussed in this application. Those of ordinary skill in the art will better appreciate the features and aspects of such embodiments, and others, upon review of the remainder of the specification.

BRIEF DESCRIPTION OF THE DRAWINGS

A full and enabling disclosure of the present subject matter, including the best mode thereof, directed to one of ordinary skill in the art, is set forth in the specification, which makes reference to the appended figures, in which.

Repeat use of reference characters throughout the present specification and appended drawings is intended to represent same or analogous features or elements of the invention. It should be appreciated that various features illustrated in the appended drawings are not necessarily drawn to scale, and thus relative relationships among the features in such drawings should not be limiting the presently disclosed technology.

DETAILED DESCRIPTION OF THE PREFERRED EMBODIMENTS

As discussed in the Summary of the Invention section, the present subject matter is particularly concerned with improved techniques for interrogating resonant devices, especially those available in condition-responsive devices such as surface acoustic wave (SAW) sensors. Such SAW sensors may be utilized in any environment where it is desired to monitor strain levels to which such sensors are subjected. A particular example of such an environment is within a vehicle tire or wheel assembly, where such physical characteristics as temperature and pressure may be monitored by one or more sensor devices. The remainder of this specification will describe aspects of the subject resonator interrogation techniques relative to a tire/wheel environment, although it should be appreciated that such techniques are not limited to utilization in such a particular application.

Figure 1:
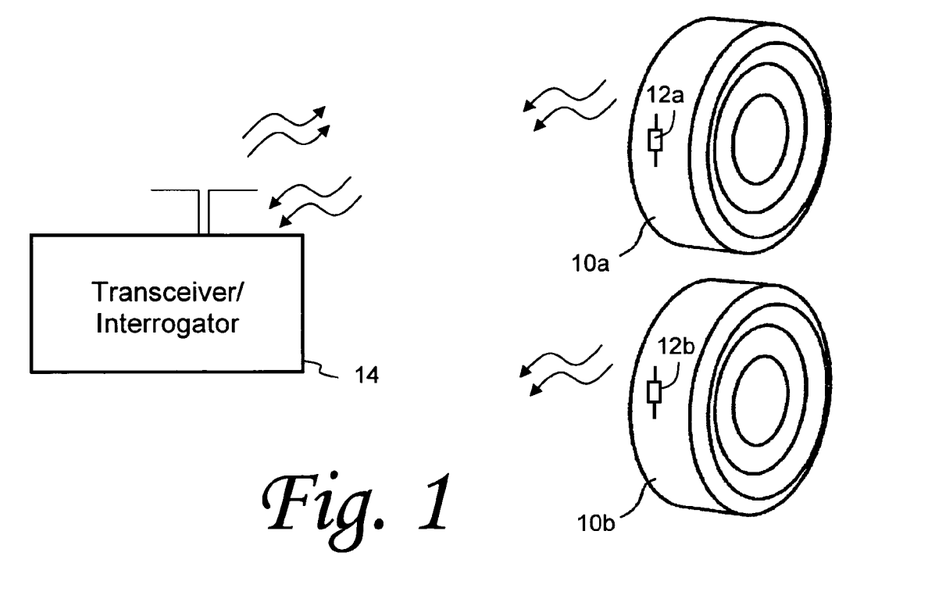
FIG. 1 provides a schematic block diagram of exemplary hardware components in a tire monitoring system, specifically depicting exemplary communication among multiple tires and corresponding resonator elements and a remote transceiver, or interrogator in accordance with aspects of the present invention.

Referring now to FIG. 1, multiple tire structures 10a and 10b may respectively incorporate condition-responsive devices 12a and 12b (generally 12) to monitor various physical parameters such as temperature and/or pressure within the tire or associated wheel assembly. For passenger, commercial or other-type vehicles incorporating more than two tires as illustrated in FIG. 1, it should be appreciated that one or more condition-responsive devices 12 may be incorporated into the structure of selected of or each of the existent tires. The condition-responsive devices 12 may be integrated with a variety of particular locations included but not limited to being attached to or embedded in the tire structures 10a, 10b or associated wheel assembly, valve stem or any other place that allows for accurate temperature and pressure measurement of the tire. Condition-responsive devices 12 may also be attached to or encased in a substrate portion such as one made of rubber, plastic, elastomer, fiberglass, etc. before being integrated in the possible locations associated with tire structures 10a, 10b.

Each condition-responsive device 12 may include at least one resonator-type element, such as a surface acoustic wave (SAW) resonator or a bulk acoustic wave (BAW) resonator. A specific example of a condition-responsive device for use in tire assemblies or other applications is a SAW device as developed by TRANSENSE TECHNOLOGIES, PLC. Specific aspects of such a device are disclosed in published U.S. Patent Application Nos. 2002/0117005 (Vile et al.) and 2004/0020299 (Freakes et al.), both of which are incorporated herein by reference for all purposes. In one embodiment, such a SAW device includes three resonator elements, each configured for operation in distinct frequency ranges of operation, such as ranges having respective center frequencies of 433.28 MHz, 433.83 MHz and 434.26 MHz. It should be appreciated that operation at different frequency ranges is within the spirit and scope of the present invention. Three resonator elements in combination yield a SAW device that can provide sufficient information to determine both the temperature and pressure levels in a tire. The resonant frequencies for such multiple resonator elements are preferably designed such that the distance between adjacent resonant frequencies is always greater than the resonator bandwidths at any pressure or temperature condition within a tire.

Referring still to FIG. 1, a transceiver/interrogator device 14 transmits a series of interrogation signals that are intended to energize one or more of the passively operating condition-responsive devices 12 at their natural frequency of oscillation (resonant frequency). After an excitation pulse, each resonator element in a condition-responsive device 12 radiates energy stored during excitation. Peak levels of this radiated energy occur at the respective resonant frequencies of the resonator elements in the condition-responsive device 12. Such signals are then received at the transceiver 14. By monitoring the changes in the radiated resonator response versus the changing frequency of the interrogation signal, information corresponding to preselected conditions within tire structure 10a, 10b can be determined.

Figure 2:
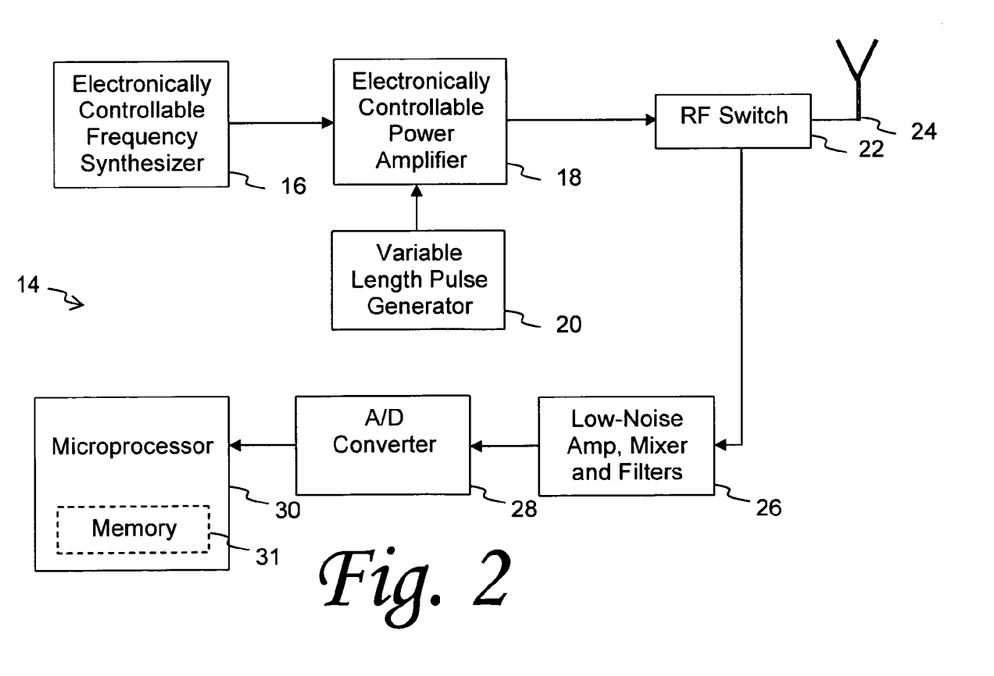
FIG. 2 provides a schematic block diagram of exemplary hardware components of a remote transceiver or interrogator in accordance with aspects of the present invention.

Referring now to FIG. 2, a discussion of exemplary components in transceiver/interrogator 14 is now presented. With the exemplary components presented herein, it is possible provide a means for locating and measuring the resonant frequency of one or more SAW resonator elements. It should be appreciated that although FIG. 2 illustrates one example of interrogator hardware components, still others may be utilized with the presently disclosed aspects and methodology. Interrogator 14 includes components that are utilized for transmitting interrogation signals as well as components that are utilized when receiving signals from one or more excited resonator elements. The transmitter portion includes an externally or electronically controllable RF power amplifier 18 that is fed from an electronically controllable frequency synthesizer 16. Frequency Synthesizer 16 is capable of generating interrogation pulses at different frequencies as defined by an external input to frequency synthesizer 16, where such frequencies may be stepped at certain defined increments (e.g., 10 Hz) and are preferably provided with a sufficient resolution for later measurement. RF power amplifier 18 may be gated by a variable length pulse generator 20 capable of forming shaped waveforms. The shaped waveforms may be used to suppress sidelobes in the interrogation pulses generated by frequency synthesizer 16 and amplified at RF amplifier 18. Sidelobe suppression may also be effected in some embodiments by hard-wired filter networks. The resultant output of amplifier 18 corresponds to interrogation pulse(s)

that are controlled in both bandwidth and frequency. It should be appreciated that narrowing the pulse length of the interrogation pulse(s) increases the bandwidth around the chosen center frequencies.

Referring still to FIG. 2, an RF switch 22 is coupled to an interrogator antenna 24. Interrogation pulses generated by the transmitter portion of transceiver 14 are radiated via antenna 24 with the intention of energizing one or more SAW resonator elements in close proximity to the transceiver/interrogator 14. Once the SAW resonator elements are energized, they reradiate energy that may then also be detected by transceiver 14. In accordance with the dual capabilities of transceiver/interrogator 14 to both transmit and receive RF signals, it should be appreciated that the transceiver may be configured to operate in either half-duplex or full-duplex communication modes. In half-duplex mode, signals are only sent one way at a time, otherwise collision among transmitted and received data may occur. In such configurations, detection of resonator response occurs after silencing the transmitter portion providing the RF source from transceiver 14 and subsequently listening for the SAW resonator. In full-duplex mode, data can be exchanged simultaneously in two directions and as such, resonator response may be detected while the RF transmission source is still active.

Referring now to the portions of transceiver/interrogator 14 that receive the reradiated response from one or more SAW resonator elements, a low-noise amplifier, mixer and associated filters (generally 26) are included for frequency conversion of the received signal to an intermediate frequency (IF). One example of an intermediate frequency value is 1 MHz, although other specific IF frequencies may be employed. The IF response is then provided to an analog-to-digital (A/D) converter 28 where the received signal is sampled at a rate sufficiently high in comparison with the IF (e.g., 10 or 20 MHz). A microprocessor 30, such as a DSP chip or other controller element, performs Fourier transformation on the sampled IF response. The detected levels of energy in the frequency components are then compared either with a reference level or with other measurements. The location of SAW resonance is then determined as the place where the strongest response to the energizing pulse(s) occurs. Microprocessor 30 may also be utilized in conjunction with user input to control other components within the transceiver/interrogator 14.

Referring still to FIG. 2, microprocessor 30 may have incorporated therein or coupled thereto a single or distributed memory element 31 in which software executed by the microprocessor 30 can be stored. Memory 31 may correspond to any specific type of volatile or non-volatile memory, such as but not limited to RAM, ROM, EEPROM, flash memory, magnetic tape, CD, DVD, etc. Selected aspects of the subject algorithms may be implemented via execution by microprocessor 30 of the software instructions stored in memory 31. For example, steps involving the determination and analysis of received resonant response signals and measurements may be effected by such microprocessor and memory components. It should also be appreciated that steps of the presently disclosed interrogation algorithms that involve the selective transmission of interrogation signals may be effected by exemplary components 16, 18 and 20 of FIG. 2.

Given that the resonant frequency of each resonator element in a SAW varies with given input parameters, SAW interrogators must typically transmit multiple RF interrogation signals in accordance with some predetermined algorithm before the precise resonant frequency(ies) of the SAW resonator element(s) is/are determined. As the interrogation search pulses move in frequency, the pulses will produce different levels of response depending on their distance in frequency space from the center frequency of each SAW resonator element. Furthermore, because many SAW resonators used as sensing elements operate over bandwidths that are large with respect to the Full Width Half Max (FWHM) peak, efficiently energizing these devices within the context of RF regulations requires locating the resonator within a relatively narrow bandwidth. In known interrogation systems, the different interrogation frequencies are stepped sequentially one at a time through a given set of discrete frequencies. Such algorithms can be inefficient in many instances since the time and energy required to interrogate a resonator element in such a fashion remains fixed until all possible frequencies are searched.

In accordance with embodiments of the present invention, an improved algorithm for transmitting RF interrogation pulses to determine optimal interrogation frequencies for one or more resonator elements is presented. Embodiments of the improved algorithm offer quicker and more efficient process steps for interrogating a SAW device, and also result in greater accuracy of search results.

An example of a search routine in accordance with aspects of the present invention will now be described with respect to the flow diagram of FIG. 3. An exemplary search routine may begin in step 32 by searching for resonator response by transmitting an initial RF pulse (or series of pulses) at a given initial frequency within the range of operation of a resonator element. Referring to FIG. 4, consider the range of operation of a given resonator element to be the frequency range defined as [a, b]. The frequency c of the initial RF pulse(s) transmitted in step 32 may correspond in one example to the center frequency of range [a, b]. In yet another example, the frequency c of the initial RF pulse(s) transmitted in step 32 may correspond to the expected value of the resonant frequency for a given resonator element. For example, when a particular resonator element in a SAW device is configured to provide information corresponding to the pressure in a given tire or wheel assembly, then the resonant frequency of the resonator element that would correspond to the normal or desired tire pressure in such a tire would be the expected value of the resonant frequency. The RF pulse(s) transmitted at the initial search frequency c may be characterized by a first predetermined bandwidth, such as one corresponding to the maximum bandwidth practically allowed and within operational regulations. After energizing the given resonant device by transmitting one or more RF pulses at the initial search frequency, the resonator response is received by a transceiver and processed to determine if the amount of energy radiated by the resonator element is greater than some predetermined threshold value. Such threshold value is set based on known characteristics of the resonator element such that a determination of the energy level in the resonator response exceeding the predetermined threshold is sufficient to establish that the resonant frequency of the element has been located.

Figure 3:
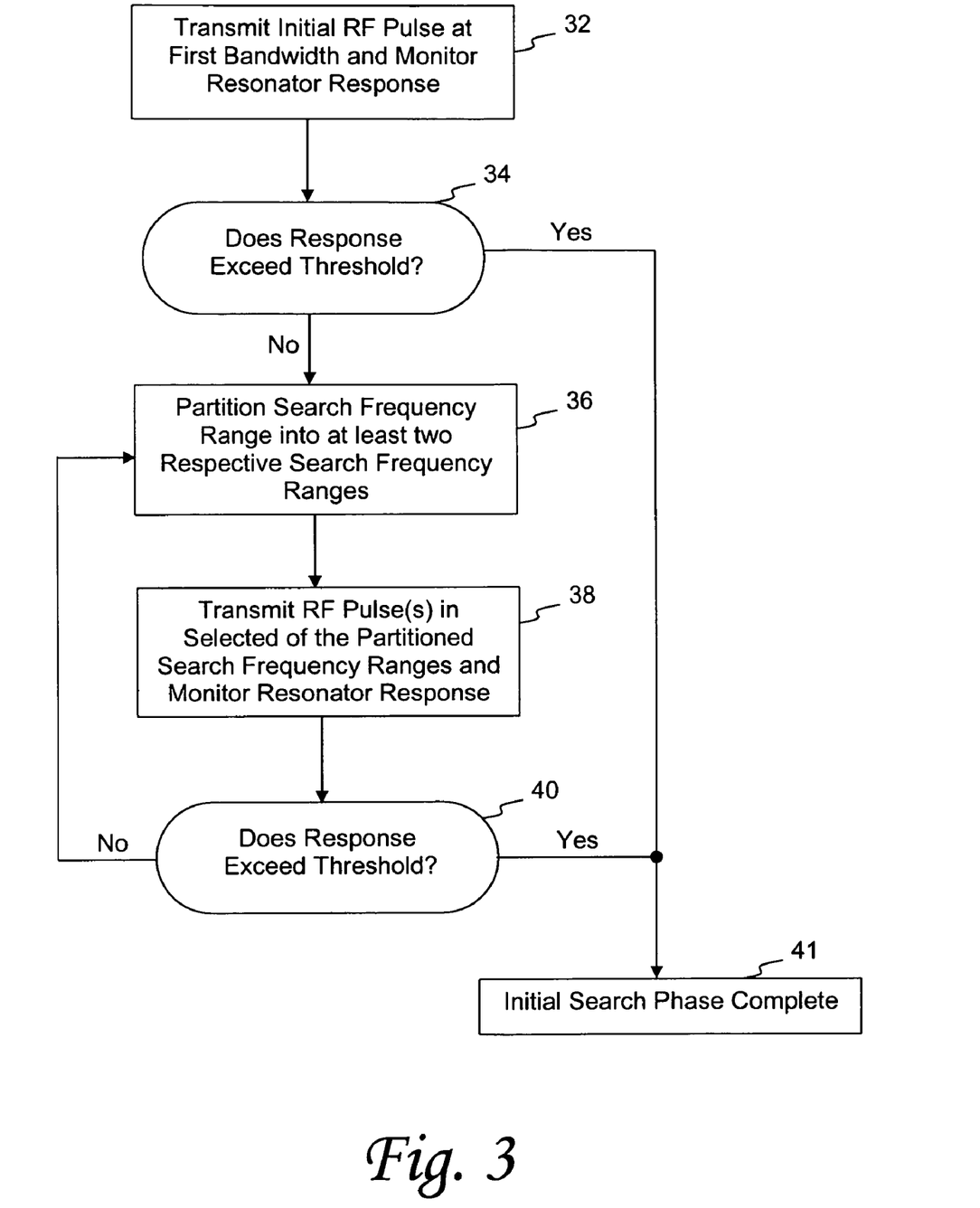
FIG. 3 provides a flow diagram of exemplary process steps in a method of determining resonant frequencies for a resonator device in accordance with aspects of the present invention.
Figure 4A:
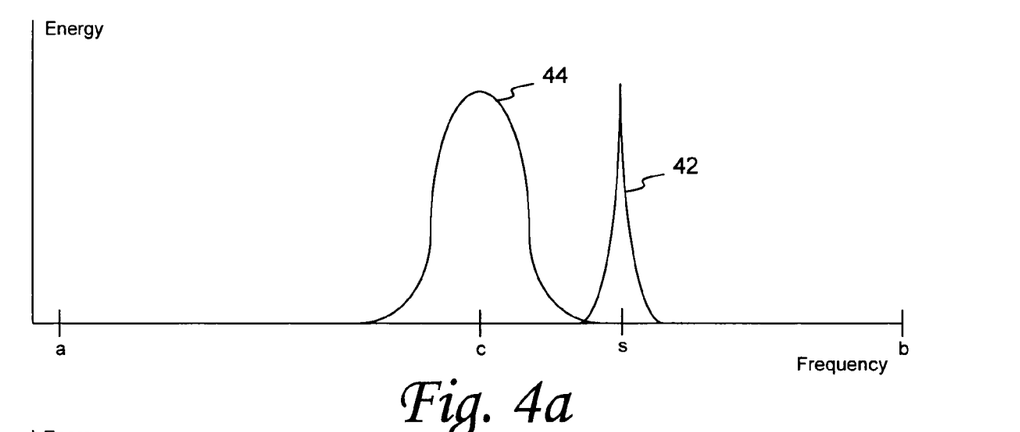
FIGS. 4a, 4b and 4c provide respective graphical illustrations of exemplary interrogation pulses transmitted in accordance with one embodiment of the methodology outlined in FIG. 3.

Referring still to FIG. 3, if it is determined at step 34 that the resonator response exceeds the threshold, then the initial search phase is completed. If not, then the search algorithm proceeds to step 36. Step 36 involves partitioning the range of operation of the resonant device [a, b] into at least two respective search frequency ranges. When following a method of bisection of the range of operation, such two respective search frequency ranges correspond to the ranges defined as [a, c] and [c, b]. Although the specific example now presented defines only two respective search frequency ranges, it should be appreciated that a greater number of partitioned search frequency ranges may be utilized in accordance with the subject algorithm. It should be appreciated in accordance with some embodiments that the search algorithm may start at step 36 of partitioning the frequency range of operation of the resonant element as opposed to with step 32 of transmitting one or more initial RF interrogation pulse(s).

Proceeding to step 38, one or more RF pulses may be transmitted in selected of the respective search frequency ranges partitioned in step 36 until a sufficient resonator response is detected. For example, a first interrogation pulse may be transmitted having the same first bandwidth as the initial RF pulse transmitted in step 32 and at a center frequency d. In one embodiment, d=(a+c)/2, the midpoint of the search frequency range [a, c]. Again, the resonator response is monitored to determine in step 40 if the predetermined threshold is exceeded. If not, additional interrogation pulses may also be transmitted in step 38 in the other frequency range partitioned in step 36. For example, the center frequency of the next transmitted pulse(s) may correspond to e, where e=(c+b)/2, or the midpoint of the search frequency range [c, b]. If the SAW resonator frequency is still not found after transmission of RF interrogation pulses in the partitioned search frequency ranges, then as indicated after step 40, the subject interrogation algorithm returns to step 36, and the previous search frequency ranges are further partitioned. The cycle of partitioning search frequency ranges, transmitting RF interrogation pulses in one or more of the partitioned ranges and monitoring the resonator response is repeated until the detected energy level in the resonator response exceeds the predetermined threshold and the initial search phase is completed at step 41.

Figure 4B:
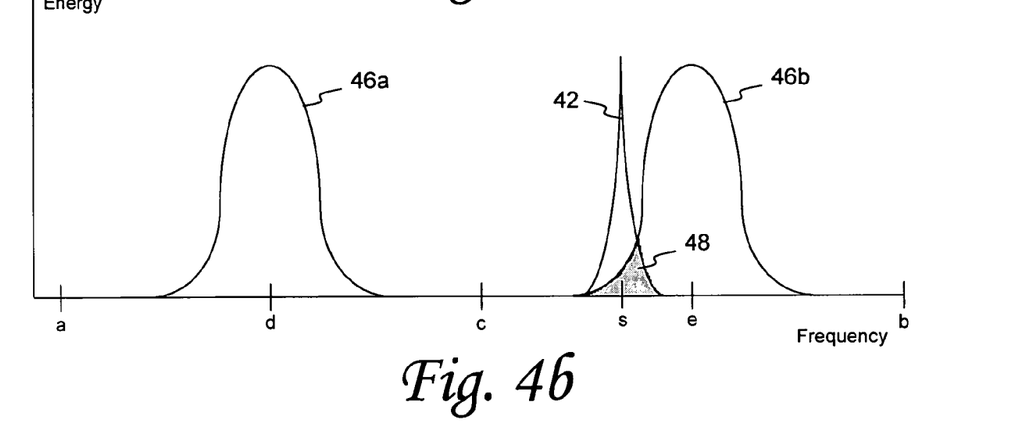
Figure 4C:
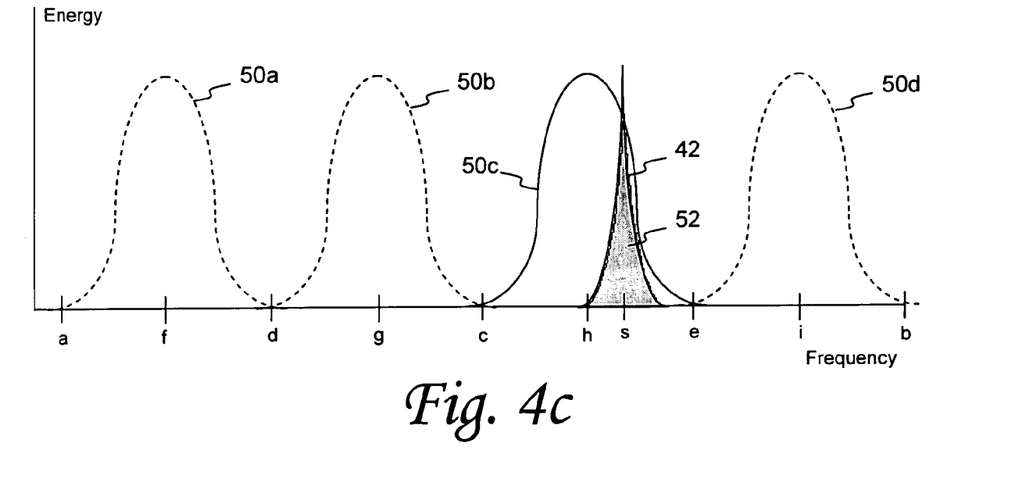

A graphically represented example of the process described in the flow diagram of FIG. 3 will now be presented with respect to FIGS. 4a-4c, respectively. Assume that a given resonator element in a SAW device is configured to function within a frequency range defined by lower and upper endpoints a and b respectively, and that at a given time the resonator frequency of such resonator element is established at a frequency s. This scenario is depicted by the energy versus frequency plot of FIG. 4a, where the energy pulse 42 centered at frequency s represents the operational resonance of the resonator element. The subject interrogation algorithm is implemented to determine where within the range of operation [a, b] the resonant frequency is located. In accordance with step 32 of FIG. 3, an initial RF pulse 44 centered at frequency c is transmitted by a transceiver/interrogator device and the resonator response is monitored. Referring to FIG. 4a, when pulse 44 is transmitted the resonator response is expected to be about zero since there is no overlap between interrogation pulse 44 and operational resonance 42. The initial search frequency range [a, b] may then be partitioned into two sub-ranges, namely [a, c] and [c, b]. Interrogation pulses may then be transmitted in one or more of these sub-ranges until a sufficient resonator response is detected. Referring to FIG. 4b, assume an interrogation pulse 46a is first transmitted at a frequency d within the range [a, c]. The resonator response from transmission of interrogation pulse 46a is also expected to be zero. As such, a next interrogation pulse 46b in the second partitioned range [c, b] is transmitted at a given frequency e. As previously mentioned, frequencies d and e may in some embodiments be chosen as the center frequencies of the respective frequency ranges [a, c] and [c, b]. In other embodiments, d and e may be randomly chosen within their defined frequency ranges.

Referring still to FIG. 4b, upon transmission of interrogation pulse 46b, the resonator response is expected to correspond to the amount of overlap between pulse 46b and resonance pulse 42, depicted as shaded area 48. The energy level defined by overlap area 48 may or may not exceed the predetermined threshold level for comparison. If it does, then the initial search phase is completed. If not, then the detected energy level can still be utilized to determine which of the previous frequency ranges [a, c] and [c, b] should be further partitioned into additional sub-ranges. In some embodiments of the subject algorithm, each previously partitioned range may be broken into further sub-ranges for searching. However, since at least some level of response was detected in range [c, b], it would make sense in some embodiments to limit subsequent searching to range [c, b]. This flexibility is intended to be represented by the next round of interrogation pulses 50a-50d, respectively, as illustrated in FIG. 4c. Interrogation pulses 50a and 50b are optional in some embodiments and thus illustrated with dashed lines. Assuming that range [c, b] is further partitioned into additional sub-ranges [c, e] and [e, b], interrogation pulses 50c and 50d may be transmitted in such respective ranges at respective frequencies h and i with subsequent monitoring of the resonator response. In one embodiment, frequency h corresponds to the center frequency of range [c, e] and frequency i corresponds to the center frequency of range [e, b]. The expected response after transmission of interrogation pulse 50c is an energy level defined by the shaded area of overlap 52. If this energy level 52 is greater than the predetermined threshold, then there is no need to transmit additional interrogation pulse 50d or to further partition the initial search frequency ranges. At this point, the initial search phase of the subject algorithm is completed (see step 41 of FIG. 3).

It should be noted with respect to the initial search phase described above that the bandwidth of each of the interrogation pulses is substantially identical. Although this is not always a requirement, it should be noted that the search is most efficient if the bandwidth of the initial search pulse is wide enough to cover the bandwidth of operation in a very few number of search steps, as illustrated. Since the energy coupled into the SAW resonator from a relatively large bandwidth pulse may be small, a rapid series of interrogation pulses at each search frequency may be used to increase the SAW resonator energy. One efficient way to implement this is to find the time integrated energy required to give an acceptable resonator response under the weakest condition (i.e., the energizing source is at the specified maximum read range), then set a fixed pulse energy product where the number of pulses is inversely proportional to the bandwidth of the pulse.

After completing the initial search phase and following the method of bisection of frequency spaces to determine an initial location of the SAW resonance using interrogation pulses characterized by a first relatively wide bandwidth, the search process (such as represented in FIG. 3) is repeated within the identified search band (e.g., band [c, e] in the example of FIG. 4c) with interrogation pulses having a narrower bandwidth and corresponding longer pulse time. Such a subsequent search preferably begins at the center frequency of the wideband pulse where the best response was located in the previously effected initial search routine (e.g., frequency h from FIG. 4c). The steps described in FIG. 3 may be repeated in an analagous manner within the new search frequency range (which is a subset of the range of operation of the device and inclusive of the frequency in the initial search routine at which the resonator response was greater than the predetermined energy threshold). Interrogation pulses characterized by a second bandwidth (narrower than the first bandwidth of the RF pulses transmitted in the initial search routine) may be transmitted in various partitioned portions of the new search frequency range until the resonator response exceeds the same or a newly defined predetermined energy threshold level. This act of bandwidth reduction and searching may be repeated for any number of times as desired until the resonant frequency of operation has been located with the narrowest desired pulse. As the pulse width is narrowed in this process, it should be appreciated that the number of pulses transmitted to sufficiently energize the resonator device (if multiple pulses are transmitted at some point in the search routine) will finally reduce to one. The narrowest pulse may be chosen so that it is the energizing frequency and the final step of the aforementioned search phase corresponds to the first step of the measurement phase which may begin at that point.

After determining the optimal interrogation frequency(ies) of the resonator device(s) in a SAW or other sensor as described in accordance with aspects of the presently disclosed search routines, the measurement phase generally involves a first step of energizing the SAW resonator with RF energy from a source of finite bandwidth. As mentioned above, this initial step may actually correspond to the last step of the search routine. The level of response of the SAW resonator may be directly measured. Additional signal analysis as implemented in known resonator measurement processes may also be performed.

The discussion above with respect to FIGS. 3 and 4a-4c, respectively, presents a particular example of a search routine for locating optimal interrogation frequencies based on general principles of a method of bisecting given search frequency ranges. This is only one particular way of reducing the search time in a resonator interrogation process compared with known methods that sequentially step through all possible resonator frequencies to determine the optimal frequencies for interrogation. It should be appreciated in accordance with the present invention that the disclosed methods based on frequency range bisection as well as others can be employed to fit the obtained resonator responses from a subset of sampled frequencies to a known curve representative of the resonator response.

Figure 5:
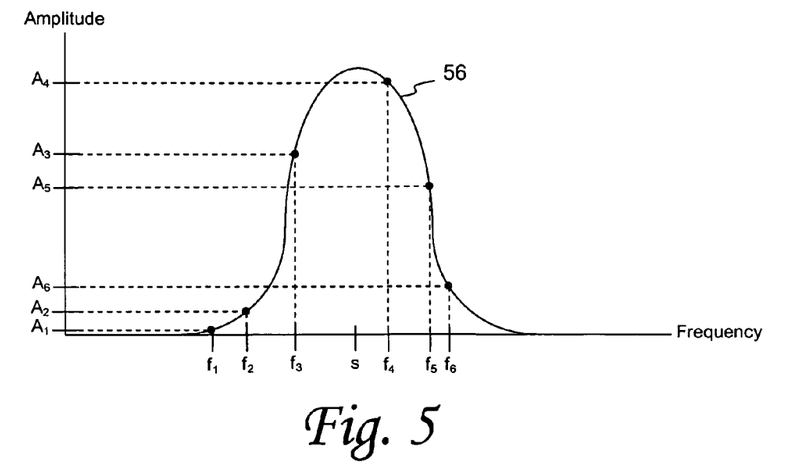
FIG. 5 provides a graphical illustration concerning aspects of fitting amplitude samples obtained at different interrogation frequencies to expected properties of a resonator output curve.

For example, referring now to FIG. 5, assume the resonant frequency of a given resonator element is some frequency s. A plot 56 of the amplitude values of the resonator response versus frequency for the given resonator element are expected to follow a generally Gaussian curve having known characteristics, typically including the standard deviation of such a curve. Now assume that the resonator is interrogated at frequencies $f_1$ through $f_6$, respectively, and that corresponding amplitude measurements ($A_1$ through $A_6$, respectively) are obtained at each frequency. The exact number of sampling frequencies may vary and the frequencies may be chosen at random or in accordance with a specific search routine, examples of which have already been provided. Based on the known characteristics of the expected resonator response and the obtained data points ($f_i$, $A_i$) for each $i^{th}$ sample, the data points can be fitted to the curve 56. This data interpolation then enables the determination of the resonant frequency s.

Figure 6A:
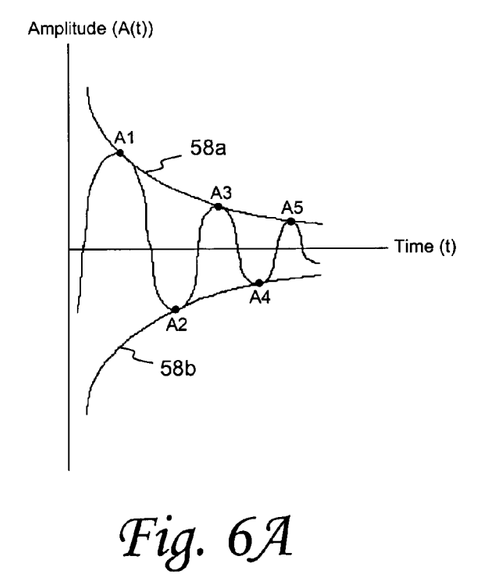
FIGS. 6A and 6B provide respective graphical illustrations of exemplary resonator response (i.e., amplitude of the response signal versus time), specifically illustrating possible variations with respect to phase of the response.
Figure 6B:
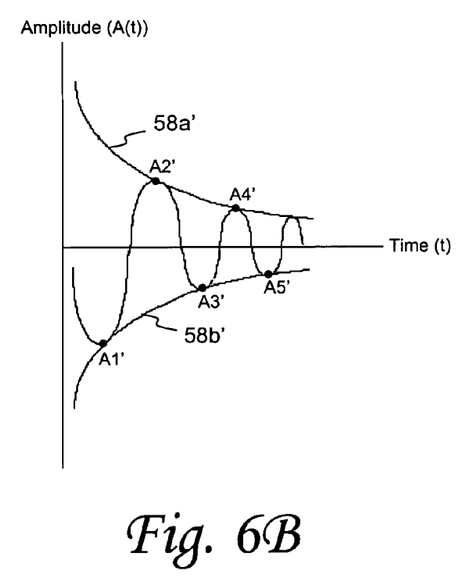

The general process described above with respect to FIG. 5 depends heavily on the accuracy of the amplitude measurements obtained at each interrogation frequency. One potential problem with such a process is that there is often an uncertainty with respect to the phase of the received resonator response, thus leading to a potential uncertainty in amplitude. This uncertainty occurs because amplitude measurements are generally determined by measuring maximum and minimum values at the intermediate frequency (IF) in a transceiver device. However, the phase of the IF is not always known when the measurement of max and min amplitude values begins. This situation is generally represented in the amplitude (A(t)) versus time (t) plots provided in FIGS. 6A and 6B. In FIG. 6A, extremum values A1, A2, A3, A4 and A5 are obtained once measurement begins. In FIG. 6B, extremum values A1', A2', A3', A4' and A5' are obtained, but the corresponding phases for the measurements obtained in FIGS. 6A and 6B are unknown.

The response curves represented in FIGS. 6A and 6B can be expressed in mathematical terms by an equation of the following form: $A(t)=ae^{-bt}\sin(ct+d)$, where a, b, c and d are known or easily determined constants. Although the time (or corresponding phase $\theta$ determined since $\theta=\omega t$) may not be known at the time of measurement, it is known that the amplitudes of the resonator response measured at the IF fit inside a decaying exponential envelope (modeled by lines 58a and 58b in FIG. 6A and by lines 58a' and 58b' in FIG. 6B). The time constant (b) of the respective decaying exponential curves is easily determined and readily repeatable. This means that if at least two and possibly more amplitude extremum measurements are obtained, then the resonator response can be fit to the decaying exponential. All amplitude measurements can then be normalized to a common phase, thereby greatly reducing the uncertainty and the corresponding possibility of error of the measurement. This can be done by solving the equation A(t) for the time t based on each measured amplitude extremum. After determining where in the known decaying exponential the measurement was taken, the equation A(t) can be solved respectively for the same values of t (or $\theta$) so that the phase of all amplitude measurements is known and constant. This normalization process can be utilized in any of the presently disclosed interrogation algorithms when additional amplitude certainty is needed or desired.

It should be appreciated in accordance with the presently disclosed technology that the described search routines may be employed for determining the resonant frequency of more than one resonator element. For example, when two or more resonator elements are present in a single sensor or a collection of single resonator elements are provided in close proximity to one another in a given environment, the disclosed steps can be implemented or repeated as necessary for each resonator element. In SAW devices with three separate resonator elements, each resonator is typically configured for operation in distinct frequency ranges of operation and so the initial and subsequent search frequency ranges should not overlap.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A method of determining the resonant frequency of a resonant device, said method comprising the steps of:
    partitioning a first designated frequency range into at least two respective first search frequency ranges;
    energizing the resonant device by transmitting one or more respective first RF pulses characterized by a first bandwidth in selected of the at least two respective first search frequency ranges;
    monitoring the response of said resonant device to the one or more first RF pulses to determine if the amount of energy radiated by said resonant device exceeds a first predetermined threshold level; and if the amount of energy radiated by said resonant device in response to the one or more first RF pulses transmitted in selected of the at least two respective first search frequency ranges does not exceed the first predetermined threshold level, repeating said partitioning, energizing and monitoring steps for additional respective search frequency ranges within the at least two respective first search frequency ranges until the amount of energy radiated by said resonant device in response to the one or more first RF pulses exceeds the predetermined threshold level.

2. The method of claim 1, wherein said first designated frequency range corresponds to the range of operation of the resonant device.

3. The method of claim 2, further comprising the steps before said partitioning step of:
energizing the resonant device by transmitting one or more initial RF pulses characterized by the first bandwidth and a frequency corresponding to the center frequency of the range of operation of the resonant device; and
monitoring the response of said resonant device to said one or more initial RF pulses to determine if the amount of energy radiated by said resonant device exceeds the first predetermined threshold level.

4. The method of claim 2, further comprising the steps before said partitioning step of:
energizing the resonant device by transmitting one or more initial RF pulses characterized by the first bandwidth and a frequency corresponding to the expected value of the resonant frequency of the resonant device; and
monitoring the response of said resonant device to said one or more initial RF pulses to determine if the amount of energy radiated by said resonant device exceeds the first predetermined threshold level.

5. The method of claim 2, wherein said at least two respective search frequency ranges comprise a first search frequency range defined from the lowest possible frequency within the range of operation of the resonant device to the expected value of the resonant frequency of the resonant device, and a second search frequency range defined from the expected value of the resonant frequency of the resonant device to the highest possible frequency within the range of operation of the resonant device.

6. The method of claim 1, wherein each said step of monitoring the response of said resonant device further comprises the steps of:
obtaining at least two maximum or minimum amplitude measurements; and
normalizing the phase of all measurements to a predetermined reference phase.

7. The method of claim 1, further comprising the steps of:
partitioning a second designated frequency range into at least two respective second search frequency ranges;
energizing the resonant device by transmitting one or more second RF pulses characterized by a second bandwidth in selected of the at least two respective search frequency ranges, wherein said second bandwidth is smaller than said first bandwidth; and
monitoring the response of said resonant device to the one or more second RF pulses to determine if the amount of energy radiated by said resonant device exceeds a second predetermined threshold level; and
if the amount of energy radiated by said resonant device in response to the one or more second RF pulses transmitted in selected of the at least two respective second search frequency ranges does not exceed the second predetermined threshold level, repeating said partitioning, energizing and monitoring steps for additional respective search frequency ranges within the at least two respective second search frequency ranges until the amount of energy radiated by said resonant device in response to the one or more second RF pulses exceeds the second predetermined threshold level.

8. The method of claim 7, further comprising the steps before said step of partitioning a second designated frequency range of:
energizing the resonant device by transmitting one or more initial RF pulses characterized by a second bandwidth and a frequency corresponding to the center frequency of the second designated frequency range; and
monitoring the response of said resonant device to said one or more initial RF pulses characterized by the second bandwidth to determine if the amount of energy radiated by said resonant device exceeds the second predetermined threshold level.

9. A method of determining an optimal interrogation frequency for a resonant device, said method comprising the steps of:
transmitting one or more RF pulses characterized by a given bandwidth at a plurality of different frequencies within a given range of frequencies;
obtaining an amplitude response measurement for the resonant device at each of the plurality of different frequencies;
repeating said transmitting and obtaining steps for one or more subsequent iterations, wherein the RF pulses transmitted in each subsequent iteration are characterized by a bandwidth less than or equal to the bandwidth of the pulses in the preceding iteration, and wherein the plurality of different frequencies at which the one or more RF pulses are transmitted in each subsequent iteration are within a selected subset of the given range of frequencies from the preceding iteration.

10. The method of claim 9, further comprising a step of determining whether any of the amplitude response measurements from said obtaining step exceed a predetermined value.

11. The method of claim 9, wherein each iteration of said transmitting and obtaining steps further comprises an additional step of determining at which particular frequency of the plurality of different frequencies the largest amplitude response measurement is obtained.

12. The method of claim 11, wherein the given range of frequencies for each said subsequent iteration is inclusive of the particular frequency identified in said determining step of the preceding iteration.

13. The method of claim 9, wherein each said obtaining step further comprises a step of obtaining at least two maximum or minimum amplitude measurements and a step of fitting each obtained said maximum or minimum amplitude measurement to a decaying exponential curve having a known time constant.

14. A method of interrogating a resonant device, comprising:
establishing one or more search frequency ranges;
energizing the resonant device by transmitting one or more RF pulses at a selected frequency within selected of said one or more search frequency ranges;
determining whether the response of the resonant device to the one or more RF pulses exceeds a first predetermined value;
if the response of the resonant device does not exceed the predetermined value in said determining step, partitioning selected of the one or more search frequency ranges into at least two new search frequency ranges and repeating said energizing, determining and partitioning steps until the response of the resonant device exceeds the first predetermined value.

15. The method of claim 14, wherein the one or more search frequency ranges from said establishing step comprises a range of operation of the resonant device.

16. The method of claim 14, wherein the one or more RF pulses transmitted within selected of the one or more search frequency ranges are characterized by a first relatively wide bandwidth.

17. The method of claim 16, further comprising the steps of:
   establishing one or more second search frequency ranges;
   energizing the resonant device by transmitting one or more RF pulses characterized by a second bandwidth at a selected frequency within selected of the one or more second search frequency ranges, wherein said second bandwidth is smaller than said first relatively wide bandwidth;
   determining whether the response of the resonant device to the one or more RF pulses exceeds a second predetermined value; and
   if the response of the resonant device does not exceed the second predetermined value, partitioning selected of the one or more second search frequency ranges into at least two new second search frequency ranges and repeating said energizing, determining and partitioning steps for the second search frequency ranges until the response of the resonant device exceeds the second predetermined value.

18. The method of claim 14, wherein the selected frequency within selected of said one or more search frequency ranges at which one or more RF pulses is transmitted comprises the center frequency of the selected search frequency range.

19. The method of claim 14, wherein said partitioning step comprises partitioning said selected of the one or more search frequency ranges into a first new frequency range corresponding to the lower half of the previous search frequency range and a second new frequency range corresponding to the upper half of the previous search frequency range.

20. The method of claim 14, wherein each said determining step further comprises:
   obtaining at least two maximum or minimum amplitude measurements; and
   normalizing the phase of each obtained measurements to a predetermined reference phase.

* * * * *